Figure 1:
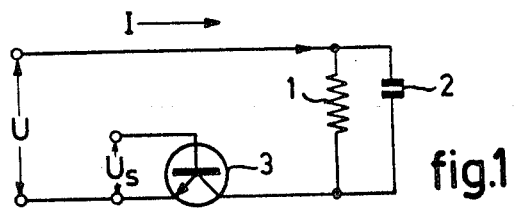

United States Patent

[11] 3,588,749

| [72] | Inventor | Herbert Meyer |
| | | Konig-Heinrich Weg, Germany |
| [21] | Appl. No. | 708,278 |
| [22] | Filed | Feb. 26, 1968 |
| [45] | Patented | June 28, 1971 |
| [73] | Assignee | U. S. Philips Corporation |
| | | New York, N.Y. |
| [32] | Priority | Feb. 25, 1967 |
| [33] | | Germany |
| [31] | | P41,495 |

[54] DIGITAL OPTICAL MODULATOR
11 Claims, 9 Drawing Figs.

[52] U.S. Cl. .................................................. 332/51
[51] Int. Cl. ...................................................... G02f 1/22,
G02f 1/26
[50] Field of Search ............................................. 350/160,
150, 151; 332/7.51

[56] References Cited
UNITED STATES PATENTS

| 3,290,619 | 12/1966 | Geusic et al. .................. | 350/160 |
| 3,304,433 | 2/1967 | Hamann ........................ | 350/160 |
| 3,320,013 | 5/1967 | Johnson ........................ | 350/160 |
| 3,342,539 | 9/1967 | Nelson et al. .................. | 350/160 |
| 3,407,017 | 10/1968 | Fleisher et al. ................ | 350/160 |
| 3,443,857 | 5/1969 | Warter .......................... | 350/160 |

*Primary Examiner*—John Kominski
*Assistant Examiner*—Darwin R. Hostetter
*Attorney*—Frank R. Trifari ABSTRACT: A digital optical modulator wherein intensity of radiation may be varied in steps by means of passing the beam through two separate modulators, each switchable between two operating points, thereby subjecting each modulator to two different field strengths.

4 Sheets-Sheet 1

INVENTOR.
HERBERT MEYER

BY
AGENT

Patented June 28, 1971 3,588,749

4 Sheets-Sheet 2

INVENTOR.
HERBERT MEYER

BY *Frank R. Trifari*

AGENT

Patented June 28, 1971

3,588,749

4 Sheets-Sheet 3

INVENTOR.
HERBERT MEYER

BY

AGENT

INVENTOR.
HERBERT MEYER

BY
AGENT

DIGITAL OPTICAL MODULATOR

Digital control of the direction of propagation of a beam of radiation, especially a laser beam, is known. The beam of radiation is deflected in one of a given pattern of directions, for example by means of a Kerr-cell and polarization elements, the pattern depending only on the geometry of the system, usually upon the angles of refraction of a system of prisms. Inaccuracies of the digital control system do not show themselves as a propagation of the radiation beam in an intermediate direction, but only as interfering radiation which propagates in the other defined directions of the pattern.

In many cases of the use of such a digital radiation beam deflecting system not only the direction of propagation but also the intensity of the radiation beam have to be changed. The invention, which relates to an electro-optic or magneto-optic modulation device, enables the intensity of a radiation to be varied in predetermined fixed steps. Since the intensity steps may directly and simply be controlled by a digital electronic signal, this modulator may suitably be combined with a digital radiation beam deflecting system, which also is controlled by digital electronic signals according to a known technique.

According to the invention this is achieved in that the arrangement comprises at least two separate modulators of different construction and different electric or magnetic operating characteristics through which the radiation to be modulated passes. Each individual modulator can be switched between two operating points in which the electro-optic or magneto-optic active material is subjected to different electric or magnetic field strengths.

In magneto-optic active materials in which the functional relationship between the applied magnetic field strength and the optic affect is abruptly altered, for example in YIG crystals, the modulation in accordance with the invention is particularly effective, because an operating point intermediate the two possible extreme values can be set either not at all or hardly.

An important advantage of the digital modulation in many cases is the appreciable saving in high-tension energy for feeding the modulators. The gain factor is at least 5 and may even be 20 to 100. This means that the power dissipated in the switches, irrespective of whether they are semiconductors or electron tubes, is also greatly reduced.

Figure 2:
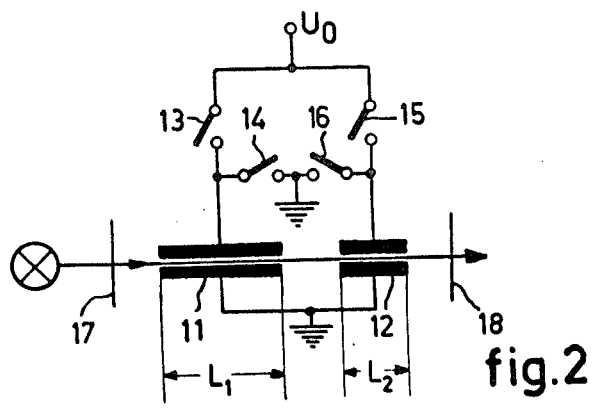
Figure 3:
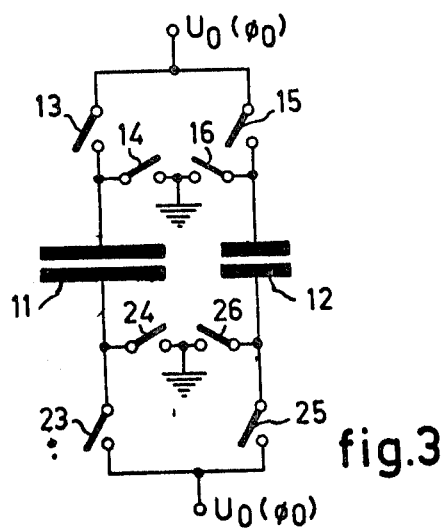
Figure 4:
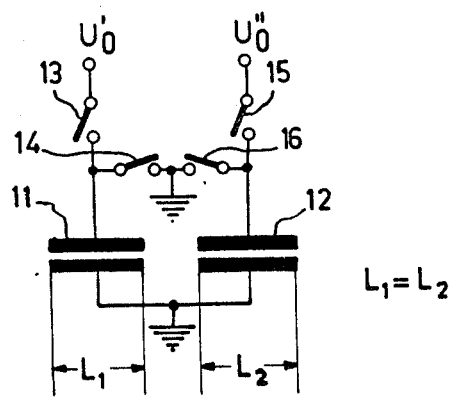
Figure 5:
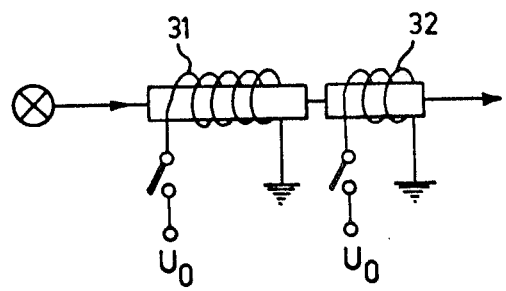
Figure 6:
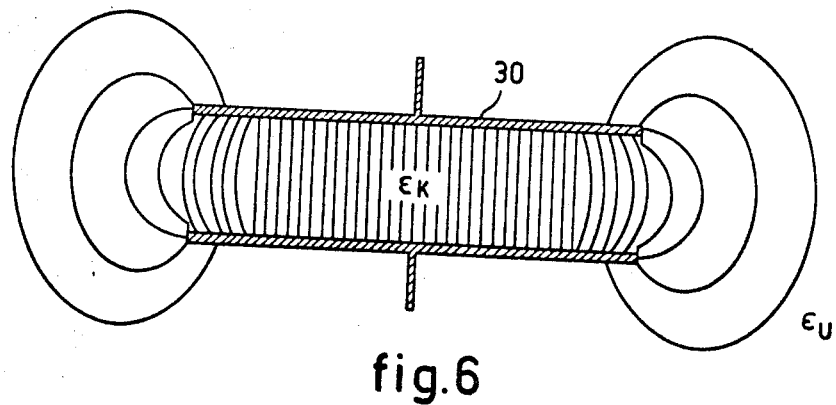
Figure 7:
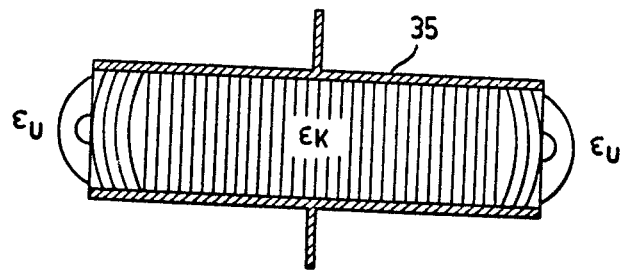
Figure 8:
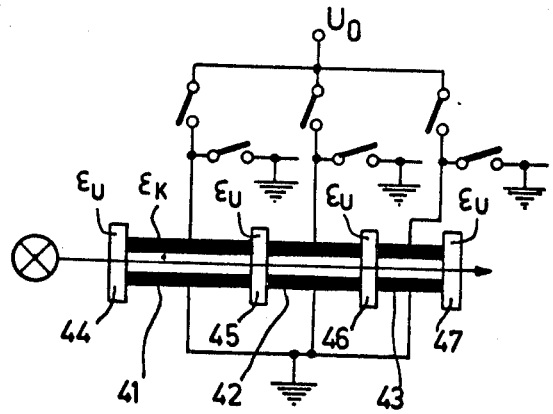
Figure 9:
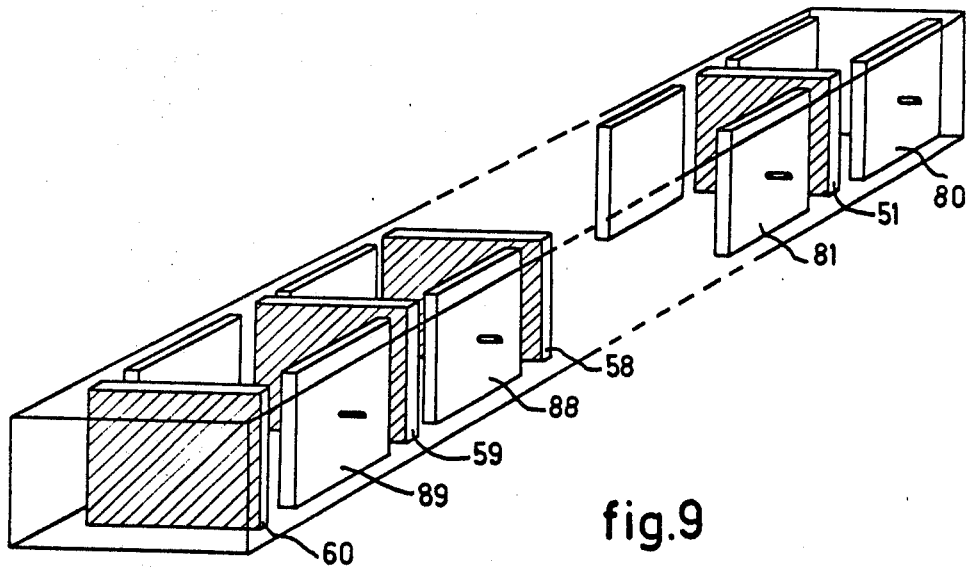

In order that the invention may readily be carried into effect, embodiments thereof will now be described, by way of example, with reference to the accompanying diagrammatic drawings, in which FIG. 1 is an example of a circuit arrangement for operating the modulator, FIGS. 2, 3 and 4 show arrangements including two partial modulators, FIG. 5 shows an arrangement using magneto-optic materials for the partial modulators, FIGS. 6 and 7 show schematically the path of the lines of force in the capacitors used in the modulators, FIG. 8 shows a device for homogeneous polarization of the active medium, and FIG. 9 shows a modulator system having logarithmically equidistant stages.

The invention is based on the recognition of the fact that with analog control of the intensity of the beam of radiation the attainment of a desired stage of intensity of the beam is directly dependent upon the stability of the properties of the control element. If, for example, the intensity is determined by the value of a voltage applied to an electro-optic modulator, for example by means of a circuit arrangement as shown in FIG. 1, in which a resistance 1 through which a current I flows produces a voltage U across a modulator 2, the voltage depends not only on the amplitude of the control voltage $U_s$ applied to the base of a transistor 3 but also on the current amplification factor of this transistor 3. As is known, however, this factor is affected by various disturbing influences (for example the temperature variation).

According to the invention a plurality of electro-optic modulators are controlled by a plurality of predetermined fixed voltages. This enables the above mentioned electronic control elements to be replaced by electronic switches the special properties of which affect the control of the modulators only in extreme limiting cases such as, for example, destruction.

The practical design of the invention will now be described more fully with reference to some examples. FIG. 2 shows a first simple example. The electro-optic modulation elements are two Kerr cells 11 and 12 filled with nitrobenzene. As is known, the law governing the electro-optic Kerr effect is:
$$\Delta = K \cdot L \cdot E^2,$$
where
$\Delta$ = the difference in path length between the ordinary and the extraordinary ray after passing through the Kerr cell,
K = Kerr constant,
L = length of the Kerr cell,
E = electric field strength in the Kerr cell.

This means that the path length difference $\Delta$ is directly proportional to the length of the Kerr cell. An essential feature is that the length $L_1$ of one Kerr cell (11) differs from the length $L_2$ of the other cell (12). As FIG. 2 shows, to each of the cells there may be applied, by means of electronic switches 13 or 14 and 15 or 16 respectively, either a voltage $U_o$ determined by a source or the voltage 0. On the basis of the above mentioned Kerr's law four different path length differences may be produced between the ordinary and the extraordinary partial beam:
$\Delta_1 = 0$,
$\Delta_2 = K \cdot L_2 \cdot E_o^2$,
$\Delta_3 = K \cdot L_1 \cdot E_o^2$,
$\Delta_4 = K \cdot (L_1 + L_2) \cdot E_o^2$.
(It is assumed that the two cells 11 and 12 have the same electrode spacings).

These four path length differences (for $L_1 = 2L_2$, $\Delta_4 = 3\Delta_2$ and $\Delta_3 = \Delta_2$), may readily be converted in intensity differences by positioning, in the manner shown in FIG. 2, this combination of Kerr cells between plane polarizers 17 and 18 of suitable orientation. Obviously, in order to provide finer stages of intensity further Kerr cells may be added to the combination described, the length of the cells increasing in geometrical progression with the common ratio two: $L_1 : L_2 : L_3 : ..... L_n = 1 : 2 : 4 : ........ 2^{n-1}$.

The manner in which the entire range of the variation in path length differences is determined by the sum total of the length of the Kerr constant and by the applied voltage $U_o$ is known from the above-mentioned law and need not be discussed in detail.

As a modification of the arrangement shown in FIG. 2, it may be of advantage to switch the two electrodes of each electro-optic modulator alternately between the potentials zero and $\Phi_o$, an example of which is shown in FIG. 3. Such an arrangement may be particularly desirable when the properties of the electro-optic material are changed by the influence of a field having a preferential direction, as has been observed, in materials such as KDP and KTN, for example.

In a further modification of the arrangement shown in FIG. 2, in the case of Kerr cells instead of the length $L_i$ the electrode spacing $D_i$ may be varied from cell to cell so that the same supply voltage $U_o$ produces different field strengths. In a still further modification of the invention, instead of the length $L_i$ the voltage $U_o$ applied to the individual cells may be varied from cell to cell, which obviously requires the use of a corresponding number of voltage sources. Such a circuit arrangement, which is shown in FIG. 4, will be used especially when there are reasons of manufacture or geometry which prevent the lengths of the cells from being made different. A hybrid arrangement comprising cells of different lengths having different supply voltages applied to them may also be used.

The principle of the invention is not limited to the use of the electro-optic liquid-filled Kerr cells. Instead of liquids, solids exhibiting the Kerr effect or Pockels effect may be used analogously. With electro-optic modulators which exhibit the linear longitudinal Pockels effect, however, only a circuit arrangement as shown in FIG. 4 can be used, since in these materials the path length differences Δ between the ordinary and extraordinary rays is independent of the length of the crystal through which the radiation passes.

According to the basic principle of the invention, magneto-optic materials may also be used. In this event the electronic circuit arrangement must be of the kind shown in FIG. 5. In this arrangement, the length difference Δ is not produced by the application of an electric field but by that of a magnetic field produced by a coil 31 and 32 respectively through which current flows.

In many cases it will be of importance for the electrostatic field E set up between the electrodes of an electro-optic switch after the application of the voltage $U_o$ to be homogenous, since this is a prerequisite for optical homogeneity. As is known, the electrostatic field lines of a parallel plate capacitor tend to bulge at the edges of the electrode plates. This undesirable effect may be reduced by utilizing the law of refraction for the lines of force of the electric excitation of a dielectric (Grimsenh, Lehrbuch der Physik, Vol II, page 73). According to this law the polarization of a dielectric separating the electrodes of a plate capacitor becomes more homogenous in proportion as the dielectric constant $\epsilon_u$ of the medium surrounding the capacitor is smaller than the dielectric constant $\epsilon_k$ of the material within the capacitor. This is illustrated in FIG. 6 which shows schematically the path of the lines of force of the electric excitation for a capacitor 30 consisting of flat plates for the case in which the medium within the capacitor is the same as the surrounding medium. FIG. 7 shows the opposite case in which the electric constant $\epsilon_k$ of the medium within the capacitor 35 considerably exceeds that of the surrounding medium.

FIG. 8 schematically shows a construction which by utilizing the above physical law ensured a more homogenous polarization of the electro-optically active medium by interposing between each two adjacent modulators 41 and 42, 42 and 43, and so on, a plate 44, 45, 46, 47, and so on, respectively, which is made of a material having a minimum dielectric constant $\epsilon_u$. In order to maintain the reflection losses of the radiation beam passing through the modulators 41, 42, 43, and so on, as small as possible, the index or refraction of the plate 44, 45, 46, and so on, respectively, must approach as close as possible to that of the electro-optic material. In order further to reduce the refraction, the plate may obviously be coated with an optically suitable layer according to a known technique.

FIG. 9 shows a modulator system by means of which the intensity of a radiation beam may be varied in logarithmically equidistant steps. Here, the dielectric plates of FIG. 8 are replaced by polarizers, for example Nicol prisms. The polarizers 51, ...., 58, 59, 60 all have the same direction of polarization, so that when the modulators are not rendered operative the radiation beam emerges from the system substantially unattenuated. The direction of polarization will preferably be at an angle of 45° to the direction of the electric field in the modulators. The interposition of polarizers, one after each partial modulator 80, 81, ...., 88, 89 ensures that the state of polarization after the passage through a partial modulator does not influence the polarization state of the radiation after each passage through the next partial modulator. Each partial modulator 80, 81, ...., 88, 89 thus changes the intensity of the radiation beam by a factor $F_i$ ($0<F_i<1$). The intensity of the beam after its passage through the entire modulator is given by the expression:

$I = I_o \cdot F_1 \cdot F_2 \cdot F_3 \ldots F_n$ or $ln I = ln I_o + ln / F_1 + l F_2 + \ldots$ A binary system having logarithmically equidistant stages is obtained, for example, by giving $F_i$ the following values:
$F_1 = 0.5, F_2 = 0.5^2, \ldots, F_i = 0.5^i$.

Obviously other values of $F_i$ are also possible. In each individual case the choice will be determined by the requirements imposed by the purpose for which the arrangement is to be used.

I claim:

1. A digital optic modulation device for modulating a radiation beam comprising at least two Polarization modulators positioned between first and second plane polarizers along the path of said beam, the first of said modulators having a first modulation characteristic, the second modulator having a second modulation characteristic different from said first modulation characteristic, said modulators together successively passing a beam of radiation to be modulated, and means coupled to each of said modulators for individually switching each of said modulators between each of two respective Polarization operating points on each of said characterics each of said modulators exhibiting a different polarization modulation corresponding to each of said operating points in accordance with said characteristic, both said polarization modulations together imparting a total modulation to said beam corresponding to said operating points, said first and second plane polarizers converting said total modulation to a corresponding intensity.

2. The combination of claim 1 wherein said modulators are electro optic and said polarization operating points are determined by respective field strengths provided by a voltage supply.

3. An arrangement as claimed in claim 2, wherein the field strengths of each modulator are produced by a common source of supply coupled to all the modulators.

4. An arrangement as claimed in claim 1, wherein each of said modulators have different lengths.

5. An arrangement as claimed in claim 1, wherein each of said modulators have different electrode spacings.

6. An arrangement as claimed in claim 1, further including the interposition between two adjacent modulators of a layer of a material the dielectric constant $\epsilon_u$ of which is smaller than the dielectric constant $\epsilon_k$ of the active modulator material, the indices of refraction of the two materials being equal or substantially equal.

7. An arrangement as claimed in claim 6 wherein the layer having the dielectric constant $\epsilon_u$ is a plane polarizer and each of said modulators alters the amplitude of the intensity of the radiation beam passing through it by a predetermined factor.

8. An arrangement as claimed in claim 1, further including a plurality of modulators positioned along the beam path, there being interposed between each two modulators a multilayer dielectric, of which one layer is designed as a plane polarizer.

9. An arrangement as claimed in claim 8, wherein the combination of the switching positions of the individual modulators alters the radiation beam to be modulated such that the logarithm of the intensity stages of the radiation beam forms a binary system.

10 An arrangement as claimed in claim 2, wherein the magneto-optically active materials used are YIG-crystals.

11. The combination of claim 1, wherein each of said modulators are magneto optic and said polarization operating points are determined by respective field strengths provided by a magnetic field.